United States Patent
Lin et al.

(10) Patent No.: US 11,880,678 B2
(45) Date of Patent: Jan. 23, 2024

(54) CHIP HAVING MEMORY

(71) Applicant: REALTEK SEMICONDUCTOR CORP., Hsinchu (TW)

(72) Inventors: Neng-Hsien Lin, Hsinchu (TW); Wan-Pei Geng, Hsinchu (TW); Yao Feng, Hsinchu (TW); Chen Shen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 161 days.

(21) Appl. No.: 17/118,000

(22) Filed: Dec. 10, 2020

(65) Prior Publication Data

US 2021/0182051 A1     Jun. 17, 2021

(30) Foreign Application Priority Data

Dec. 11, 2019   (CN) .......................... 201911269473.0

(51) Int. Cl.
*G06F 12/00* (2006.01)
*G06F 13/00* (2006.01)
*G06F 8/654* (2018.01)

(52) U.S. Cl.
CPC .................................. *G06F 8/654* (2018.02)

(58) Field of Classification Search
CPC .......... G06F 12/02; G06F 8/654; G06F 12/00; G06F 13/00
See application file for complete search history.

(56) References Cited

U.S. PATENT DOCUMENTS

| | | | |
|---|---|---|---|
| 5,764,655 A | 6/1998 | Kirihata et al. | |
| 5,959,489 A * | 9/1999 | Walck | H01L 27/1443 257/E27.128 |
| 6,055,632 A | 4/2000 | Deegan et al. | |
| 7,444,575 B2 | 10/2008 | Ong | |
| 7,502,240 B2 * | 3/2009 | Leung | H03K 3/356121 363/72 |
| 7,657,886 B1 | 2/2010 | Chen et al. | |
| 9,343,176 B2 | 5/2016 | Chung | |
| 10,261,894 B2 | 4/2019 | Tripathi et al. | |
| 2003/0051192 A1 * | 3/2003 | Pillay | G06F 11/2236 714/39 |
| 2005/0289428 A1 | 12/2005 | Ong | |
| 2007/0245200 A1 | 10/2007 | Hattori et al. | |

(Continued)

FOREIGN PATENT DOCUMENTS

| | | |
|---|---|---|
| CN | 109388421 A | 2/2019 |
| JP | 2-240899 A | 9/1990 |

(Continued)

*Primary Examiner* — Pierre Michel Bataille
(74) *Attorney, Agent, or Firm* — Birch, Stewart, Kolasch & Birch, LLP

(57) ABSTRACT

A chip includes a power pin, a ground pin, a plurality of input/output (I/O) pins, a readable/writable memory, a switching circuit, and a control circuit. The I/O pins include a plurality of mapping pins and a control pin. The readable/writable memory includes a clock port, a plurality of I/O ports, and an enable port. The control circuit selectively activates or does not activate the switching circuit according to the control pin. When the switching circuit is activated, the switching circuit electrically couples the clock port, the I/O ports, and the enable port to the mapping pins respectively.

12 Claims, 4 Drawing Sheets

(56) References Cited

U.S. PATENT DOCUMENTS

2008/0122659 A1    5/2008  Hou et al.
2012/0072790 A1    3/2012  Burggraf, III et al.
2019/0340144 A1*  11/2019  Li ........................ G06F 13/4072
2020/0327932 A1*  10/2020  Verma ................... G11C 11/419
2020/0393229 A1*  12/2020  Feda ..................... F42C 11/002
2022/0206695 A1*   6/2022  Zhao ..................... G06F 3/0673

FOREIGN PATENT DOCUMENTS

| TW | 200500933 A | 1/2005 | |
|----|---|---|---|
| TW | 200724950 A | 7/2007 | |
| TW | 200802394 A | 1/2008 | |
| TW | 200823755 A | 6/2008 | |
| TW | 200912936 A | 3/2009 | |
| TW | 201602791 A | 1/2016 | |
| TW | M577543 U | 5/2019 | |
| WO | WO-2005017662 A2 * | 2/2005 | ........... H04L 12/433 |
| WO | WO 2012/123243 A1 | 9/2012 | |
| WO | WO 2015/183404 A2 | 12/2015 | |

* cited by examiner

CHIP HAVING MEMORY

CROSS-REFERENCE TO RELATED APPLICATION

This non-provisional application claims priority under 35 U.S.C. § 119(a) to Patent Application No. 201911269473.0 filed in China, P.R.C. on Dec. 11, 2019, the entire contents of which are hereby incorporated by reference.

BACKGROUND

Technical Field

The disclosure describes a chip, especially a chip having a memory.

Related Art

A chip is an integrated circuit that performs a specific or general function. The chip includes a control circuit and a memory. The memory is accessed during operations of the chip, and may further store firmware. The firmware is a software for driving the chip, and the chip performs functions according to the firmware. In addition, a device connected to the chip can recognize the type and the functions of the chip through communication with the firmware of the chip.

Depending on customization or different applications, the firmware of the chip needs to be updated. The firmware is updated through a communication interface of the chip. However, different chips have different communication interfaces, such as I2C, a system management bus (SMBus), a universal serial bus (USB), and a serial port. Therefore, for updating the firmware of the chip, in addition to being limited to the communication interface supported by the chip, the transmission speed during the update is also limited to the transmission speed supported by the communication interface.

SUMMARY

In view of the above, the disclosure provides a chip adapted to update firmware in the memory.

According to some embodiments, the chip includes a power pin, a ground pin, a plurality of input/output (I/O) pins, a readable/writable memory, a switching circuit, a control circuit, and a processing circuit. The I/O pins include a control pin. The readable/writable memory includes a plurality of ports. The control circuit selectively activates or does not activate the switching circuit according to the control pin. When the switching circuit is activated, the switching circuit electrically couples the ports to the mapping pins, respectively.

Therefore, according to some embodiments, when the switching circuit of the chip is activated, the clock port, the I/O ports, and the enable port of the ports of the readable/writable memory are electrically coupled to the mapping pins of the I/O pins. In this way, a programming device can directly control the readable/writable memory, and program a firmware in the readable/writable memory through the mapping pins. This programming operation is not limited to a communication interface of the chip, and a transmission speed of the programming is not limited to a transmission speed of the communication interface either.

DETAILED DESCRIPTION

Figure 1:
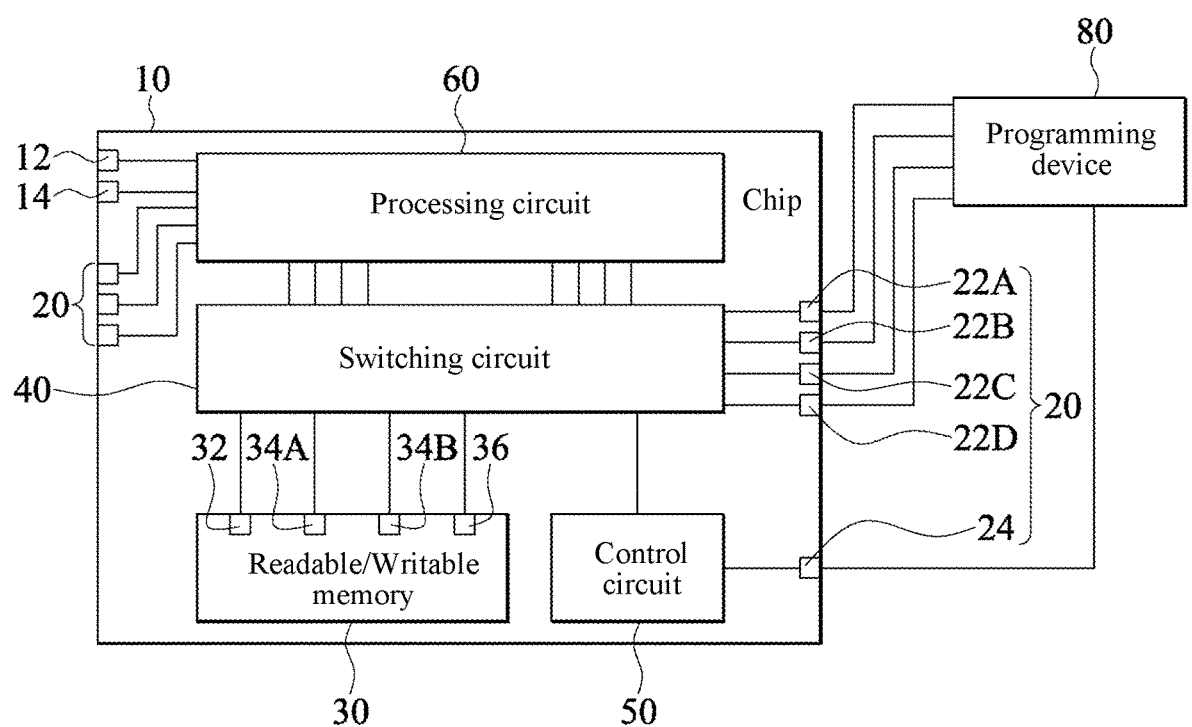
FIG. 1 illustrates a schematic block diagram of a chip according to some embodiments.

Referring to FIG. 1, FIG. 1 illustrates a schematic block diagram of a chip 10 according to some embodiments. The chip 10 includes a power pin 12, a ground pin 14, a plurality of I/O pins 20, a readable/writable memory 30, a switching circuit 40, and a control circuit 50. The I/O pins 20 include a plurality of mapping pins 22A to 22D and a control pin 24. The readable/writable memory 30 includes a plurality of ports. The plurality of ports include a clock port 32, a plurality of I/O ports 34A and 34B, and an enable port 36. The control circuit 50 selectively activates or does not activate the switching circuit 40 according to the control pin 24. When the switching circuit 40 is activated, the switching circuit 40 electrically connects the clock port 32, the I/O ports 34A and 34B, and the enable port 36 to the mapping pins 22A to 22D respectively.

Therefore, a programming device 80 causes the control circuit 50 to activate the switching circuit 40 through the control pin 24. When the switching circuit 40 is activated, the clock port 32, the I/O ports 34A and 34B, and the enable port 36 of the readable/writable memory 30 are electrically connected to the mapping pins 22A to 22D respectively. In this way, the programming device 80 can directly control the readable/writable memory 30 through the mapping pins 22A to 22D, and program firmware in the readable/writable memory 30. This programming operation is not limited to a communication interface of the chip 10, and a transmission speed of the programming is not limited to a transmission speed of the communication interface either.

The chip 10 is the chip 10 including the readable/writable memory 30 that can store the firmware. According to some embodiments, the chip 10 is a general-purpose integrated circuit or a functional integrated circuit. The chip 10 is, for example, but not limited to, a central processing unit (CPU), a microprocessor, an application-specific integrated circuit (ASIC), or a system on a chip (SOC).

The chip 10 has a plurality of pins for electrically connecting to and communicating with a peripheral device. The pins of the chip 10 include the power pin 12, the ground pin 14, and the I/O pins 20. The power pin 12 is, for example, but not limited to, a pin for supplying power for operating of the chip 10. The power of the power pin 12 may be from the programming device 80 or other external devices. According to some embodiments, the chip 10 includes a plurality of power pins 12.

The ground pin 14 is, for example, but not limited to, a pin for grounding the chip 10 and the programming device 80. In some embodiments, the ground of the programming device 80 is electrically connected to the ground pin 14. According to some embodiments, the chip 10 includes a plurality of ground pins 14.

The programming device 80 is configured to program the readable/writable memory 30 of the chip 10 and update the data in the readable/writable memory 30. The programming device 80 may be, for example, but not limited to, a universal programmer, a mass programmer, or a dedicated programmer.

The readable/writable memory 30 is, for example, but not limited to, an electrically-erasable programmable read-only memory (EEPROM), a flash memory, and other non-volatile memories (NVM). The clock port 32 of the readable/writable memory 30 is configured to receive a clock signal provided by the outside, and the readable/writable memory 30 operates according to the clock signal. The I/O ports 34A and 34B of the readable/writable memory 30 are configured to receive or send data of the readable/writable memory 30. The enable port 36 of the readable/writable memory 30 is used by an external device to control the readable/writable memory 30. Specifically, the external device is, for example, but not limited to, a microprocessor. The microprocessor generates an enable signal to enable the readable/writable memory 30. In some embodiments, the enable signal is a level signal. For example, when the level signal is at a high level, it indicates that the readable/writable memory 30 is enabled. When the level signal is at a low level, it indicates that the readable/writable memory 30 is not enabled. However, this is not limited thereto. When the level signal is at a low level, it indicates that the readable/writable memory 30 is enabled. When the level signal is at a high level, it indicates that the readable/writable memory 30 is not enabled. In some embodiments, the enable signal is a sequence signal. For example, when the microprocessor sends a sequence signal to the enable port 36, the readable/writable memory 30 is enabled when the content of the sequence signal conforms to an enable sequence; otherwise, the readable/writable memory 30 is not enabled.

In some embodiments, the chip 10 includes a processing circuit 60. The processing circuit 60 is configured to access the data of the readable/writable memory 30 and perform the function of the chip 10. In addition, the processing circuit 60 is configured to access data of the I/O pins 20 as well (for example, the processing circuit 60 access data of the mapping pins 22A to 22D). According to some embodiments, the chip 10 has two modes: a programming mode and a normal mode. When the switching circuit 40 is not activated by the control circuit 50, that is, the chip 10 is in the normal mode, the mapping pins 22A to 22D, the clock port 32, the I/O ports 34A and 34B, and the enable port 36 are electrically connected to the processing circuit 60 through the switching circuit 40, and the chip 10 performs the existing function.

Figure 3:
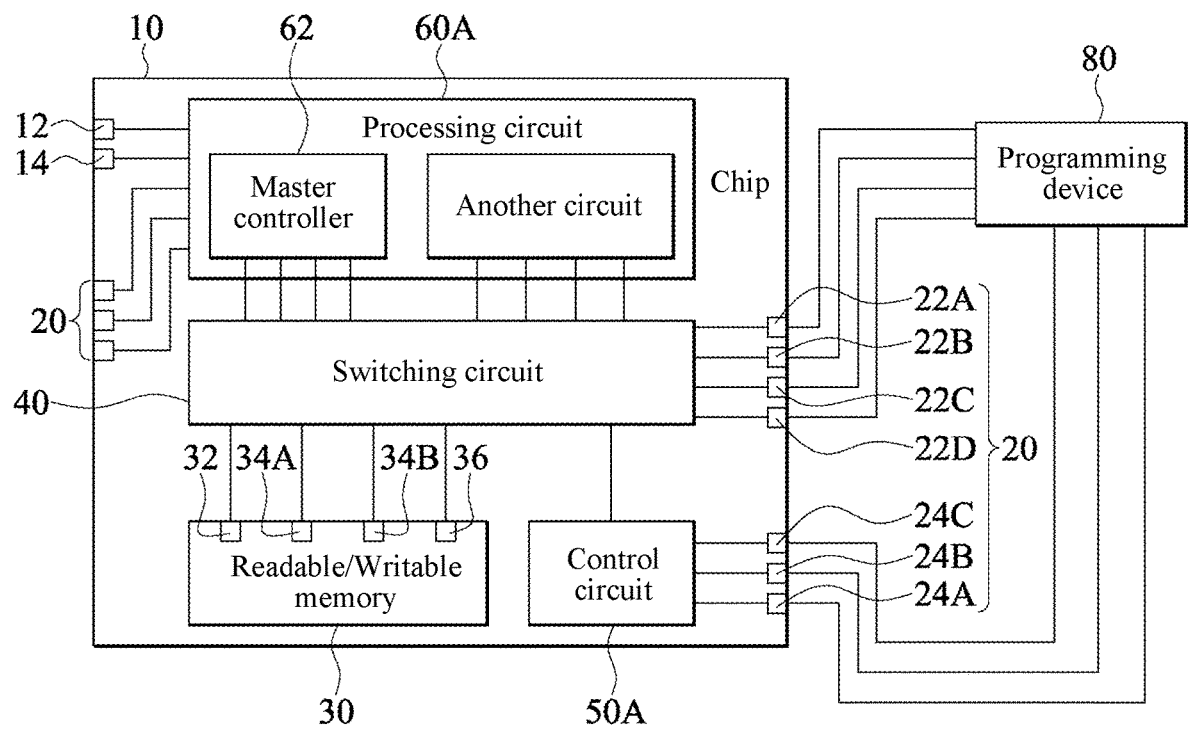
FIG. 3 illustrates a schematic block diagram of a chip according to some embodiments.

In some embodiments, the processing circuit (the processing circuit 60A) includes a master controller 62 (as shown in FIG. 3). The master controller 62 is configured to access the data of the readable/writable memory 30. When the switching circuit 40 is not activated by the control circuit 50, that is, the chip 10 is in the normal mode, the clock port 32, the I/O ports 34A and 34B, and the enable port 36 are electrically connected to the master controller 62 through the switching circuit 40. Therefore, the master controller 62 can access and control the readable/writable memory 30. In addition, the mapping pins 22A to 22D are electrically coupled to another circuit of the processing circuit 60A (for example, another circuit that does not include the master controller 62 in processing circuit 60A) when the switching circuit is not activated.

Figure 2:
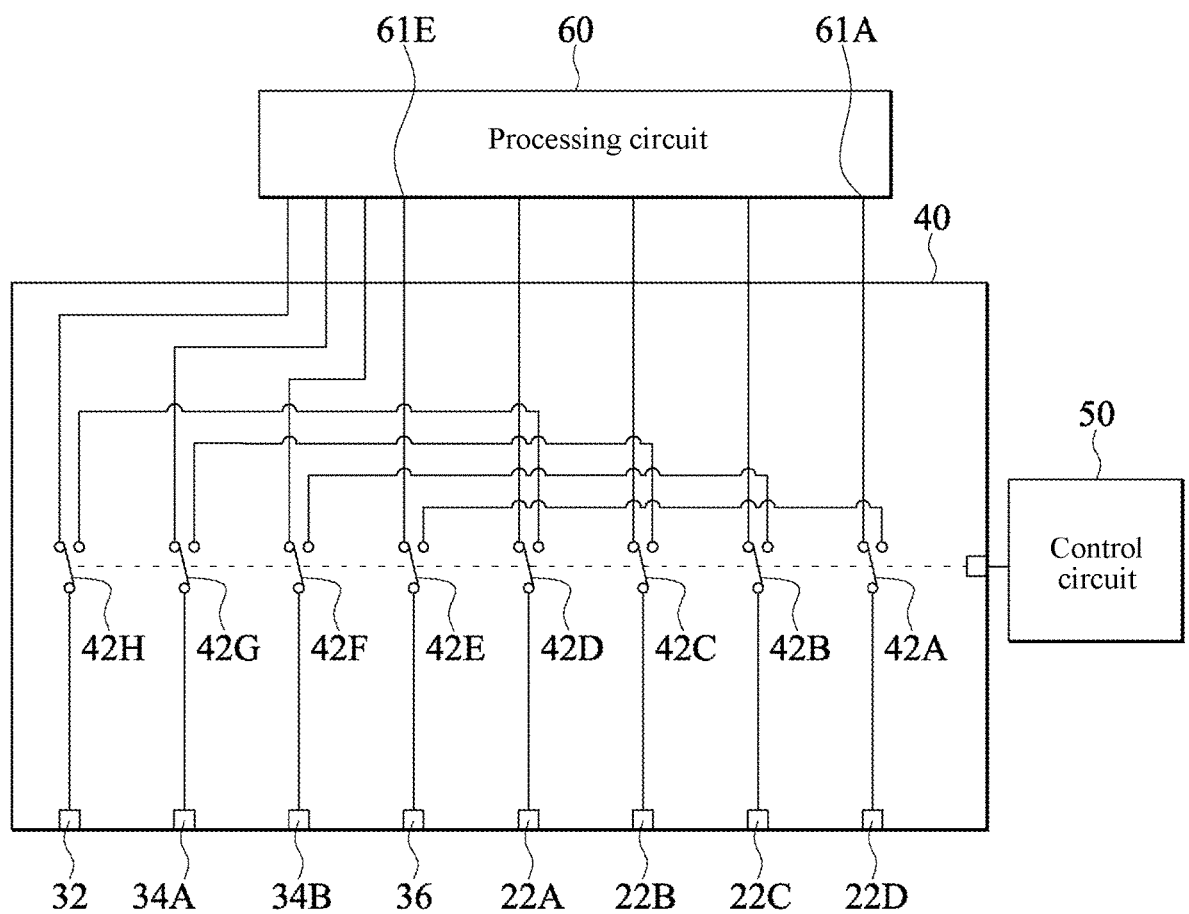
FIG. 2 illustrates a schematic block diagram of a switching circuit according to some embodiments.

Referring to FIG. 2, FIG. 2 illustrates a schematic block diagram of a switching circuit 40 according to some embodiments. The switching circuit 40 of the chip 10 includes a plurality of switches 42A to 42H. The switches 42E to 42H respectively correspond to the clock port 32, the I/O ports 34A and 34B, and the enable port 36 of the readable/writable memory 30, and the switches 42A to 42D respectively correspond to the mapping pins 22A to 22D of the chip 10. When the switching circuit 40 of the chip 10 is not activated, the mapping pins 22A to 22D are electrically connected to the processing circuit 60 through the switches 42A to 42D, and the clock port 32, the I/O ports 34A and 34B, and the enable port 36 are electrically connected to the processing circuit 60 through the switches 42E to 42H. Therefore, the processing circuit 60 can perform the function of the chip 10. When the switching circuit 40 of the chip 10 is activated, the clock port 32, the I/O ports 34A and 34B, and the enable port 36 of the readable/writable memory 30 are electrically connected to the mapping pins 22A to 22D respectively. Taking the switch 42A and the switch 42E as an example, the switch 42A corresponds to a contact 61A of the processing circuit and the mapping pin 22D, and the switch 42E corresponds to the enable port 36 and a contact 61E of the processing circuit. The switch 42A corresponds to the switch 42E. When the switch 42A and the switch 42E are not activated, the switch 42A electrically connects the mapping pin 22D to the contact 61A, and the switch 42E electrically connects the enable port 36 to the contact 61E. When the switch 42A and the switch 42E are activated, the switch 42A electrically connects the mapping pin 22D to the enable port 36 through switching.

Referring to FIG. 1. The control circuit 50 selectively activates or does not activate the switching circuit 40 according to the control pin 24. In some embodiments, the control pin 24 receives a level signal or a sequence signal, and the control circuit 50 selectively activates or does not activate the switching circuit 40 according to the signal received by the control pin 24. For example, when the level signal is at a high level, it indicates that the switching circuit 40 is enabled. When the level signal is at a low level, it indicates that the switching circuit 40 is not enabled. However, this is not limited thereto. When the level signal is at a low level, it indicates that the switching circuit 40 is enabled. When the level signal is at a high level, it indicates that the switching circuit 40 is not enabled. For example, when the microprocessor sends a sequence signal to the control pin 24, the control circuit 50 activates the switching circuit 40 when the content of the sequence signal conforms to an activating sequence; otherwise, the switching circuit 40 is not activated. In some embodiments, the control circuit 50 includes a master controller. The master controller is electrically connected to the control pin 24 and receives a level signal or a digital sequence provided by the outside.

Referring to FIG. 3, FIG. 3 illustrates a schematic block diagram of a chip 10 according to some embodiments. In some embodiments, the control circuit (the control circuit 50A) is a logic circuit. The I/O pins 20 include a plurality of control pins 24A to 24C. When a combination of the control pins 24A to 24C is a preset value, the logic circuit activates the switching circuit 40 to make the chip 10 enter the programming mode. According to some embodiments, the logic circuit has one or more input terminals that can be electrically connected to the control pins 24A to 24C respectively and output at least one logic result. The logic circuit may be, but is not limited to, a logic gate, or a combination of a plurality of logic gates. The logic gate is, for example, but not limited to, an inverter, an AND gate, an OR gate, an exclusive OR gate, a buffer gate, or other logic gates. The preset value may be a combination of logic 0 and logic 1.

Figure 4:
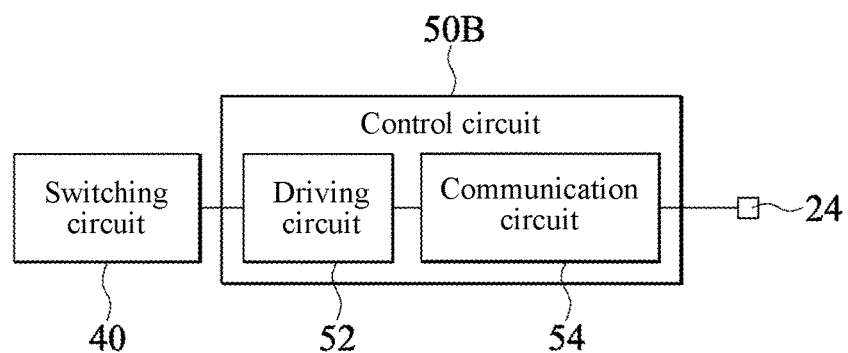
FIG. 4 illustrates a schematic block diagram of a control circuit according to some embodiments.

Referring to FIG. 4, FIG. 4 illustrates a schematic block diagram of a control circuit 50B according to some embodiments. In some embodiments, the control circuit (the control circuit 50B) includes a driving circuit 52 and a communication circuit 54. The communication circuit 54 is electrically connected to the control pin 24 and actives the driving circuit 52 according to a signal received by the control pin 24. When the driving circuit 52 is activated, the switching circuit 40 is activated, so that the chip 10 enters the programming mode. According to some embodiments, the communication circuit 54 may be, for example, but not limited to, an RS232 communication interface. According to some embodiments, the driving circuit 52 may be, for example, but not limited to, a circuit for amplifying a control signal.

Figure 5:
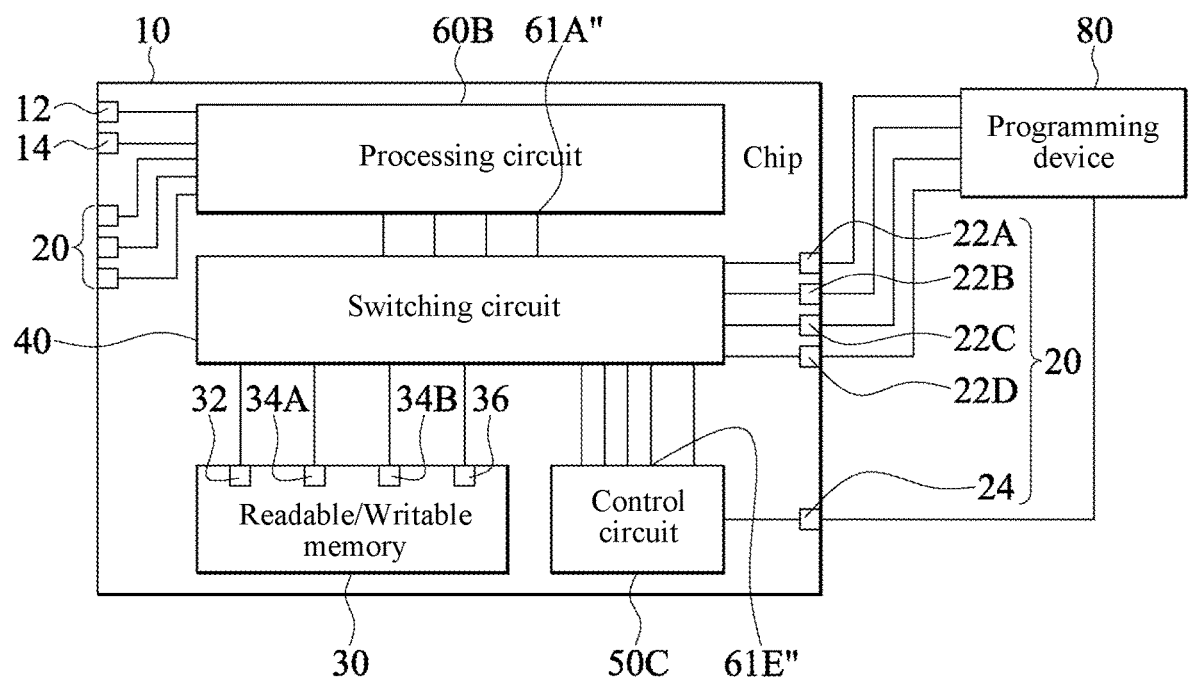
FIG. 5 illustrates a schematic block diagram of a chip according to some embodiments.

Referring to FIG. 5, FIG. 5 illustrates a schematic block diagram of a chip 10 according to some embodiments. In some embodiments, the control (the control circuit 50C) is a master controller. The master controller activates the switching circuit 40 according to the signal received by the control pin 24, that is, the chips 10 enters the programming mode, and the master controller electrically connects the clock port 32, the I/O ports 34A and 34B, and the enable port 36 to the mapping pins 22A to 22D. In this embodiment, the control circuit 50C (the master controller) and the programming device 80 may receive and send signals through, but not limited to, I²C, RS232, USB, SMBus, and other types of protocols. When the switching circuit 40 is not activated as the chip 10 is in the normal mode, the clock port 32, the I/O ports 34A and 34B, and the enable port 36 are electrically connected to the master controller respectively. Therefore, the master controller can access and control the readable/writable memory 30. Taking a contact 61E" of the control circuit 50C (the master controller) as an example, in the normal mode, the enable port 36 is electrically connected to the contact 61E" of the control circuit 50C (the master controller) through the switch 42E of the switching circuit 40 (as shown in FIG. 2). According to some embodiments, the chip 10 further includes a processing circuit 60B, wherein the processing circuit 60B is another circuit that does not include the master controller in processing circuit 60A of FIG. 3. According to some embodiments, when the switching circuit 40 is not activated, that is, the chip 10 is in the normal mode, the mapping pins 22A to 22D are electrically connected to the processing circuit 60B through the switching circuit 40. Therefore, the processing circuit 60 can perform the original functions of the chip 10. Taking a contact 61A" of the processing circuit 60B as an example, in the normal mode, the mapping pin 22D is electrically connected to the contact 61A" of the processing circuit 60B through the switch 42A of the switching circuit 40 (as shown in FIG. 2).

In view of the above, according to some embodiments, when the switching circuit 40 of the chip 10 is activated, the clock port 32, the I/O ports 34A and 34B, and the enable port 36 of the ports of the readable/writable memory 30 are electrically coupled to the mapping pins to the mapping pins 22A to 22D of the I/O pins respectively. In this way, the programming device 80 can directly control the readable/writable memory 30 through the mapping pins 22A to 22D, and program the firmware in the readable/writable memory 30. This programming operation is not limited to a communication interface of the chip, and a transmission speed of the programming is not limited to a transmission speed of the communication interface either.

What is claimed is:

1. A chip, comprising:
   a processing circuit;
   a power pin;
   a ground pin;
   a plurality of input/output (I/O) pins including a control pin;
   a readable/writable memory including a plurality of ports;
   a switching circuit configured to electrically couple the ports to the I/O pins when activated; and
   a control circuit configured to selectively activate or not activate the switching circuit according to the control pin, wherein when the switching circuit is not activated, the ports are electrically coupled to the processing circuit or the control circuit through the switching circuit, wherein the plurality of I/O pins further include a plurality of mapping pins, and when the switching circuit is activated, the ports are electrically coupled to the mapping pins respectively through the switching circuit.

2. The chip according to claim 1, when the switching circuit is not activated, the mapping pins and the ports are electrically coupled to the processing circuit through the switching circuit.

3. The chip according to claim 1, wherein the plurality of ports including a clock port, a plurality of I/O ports, and an enable port, and the switching circuit electrically couple the clock port, the I/O ports, and the enable port to the mapping pins respectively when activated.

4. The chip according to claim 3, wherein when the switching circuit is not activated, the mapping pins, the clock port, the I/O ports, and the enable port are electrically coupled to the processing circuit through the switching circuit.

5. The chip according to claim 4, wherein the processing circuit comprises a master controller, and when the switching circuit is not activated, the clock port, the I/O ports, and the enable port are electrically coupled to the master controller through the switching circuit.

6. The chip according to claim 3, wherein the control circuit is a master controller, the master controller, according to the control pin, activates the switching circuit to electrically couple the clock port, the I/O ports, and the enable port to the mapping ports respectively, and when the switching circuit is not activated, the clock port, the I/O ports, and the enable port are electrically coupled to the master controller respectively through the switching circuit, and the mapping pins are electrically coupled to the processing circuit through the switching circuit.

7. The chip according to claim 3, wherein the control circuit is a logic circuit, the I/O pins comprise a plurality of control pins, and the logic circuit activates the switching circuit when a combination of the control pins is a preset value.

8. The chip according to claim 3, wherein the control circuit comprises:
   a driving circuit configured to activate the switching circuit when activated; and
   a communication circuit electrically coupled to the control pin and configured to activate the driving circuit according to the control pin.

9. The chip according to claim 3, wherein the readable/writable memory is a non-volatile memory.

10. The chip according to claim 1, wherein the control circuit is a logic circuit, the I/O pins comprise a plurality of control pins, and the logic circuit activates the switching circuit when a combination of the control pins is a preset value.

11. The chip according to claim 1, wherein the control circuit comprises:
   a driving circuit configured to activate the switching circuit when activated; and
   a communication circuit electrically coupled to the control pin and configured to activate the driving circuit according to the control pin.

12. The chip according to claim 1, wherein the readable/writable memory is a non-volatile memory.

\* \* \* \* \*